(12) United States Patent
Jeong et al.

(10) Patent No.: US 7,884,993 B2
(45) Date of Patent: Feb. 8, 2011

(54) ELECTROPHORETIC DISPLAY DEVICE

(75) Inventors: Young Sik Jeong, Seoul (KR); Sang Yeup Lee, Uiwang-si (KR)

(73) Assignee: LG Display Co., Ltd., Seoul (KR)

( * ) Notice: Subject to any disclaimer, the term of this patent is extended or adjusted under 35 U.S.C. 154(b) by 308 days.

(21) Appl. No.: 11/601,224

(22) Filed: Nov. 17, 2006

(65) Prior Publication Data
US 2007/0115250 A1 May 24, 2007

(30) Foreign Application Priority Data
Nov. 18, 2005 (KR) ................. 10-2005-0110511

(51) Int. Cl.
*G02F 1/07* (2006.01)
(52) U.S. Cl. ............... 359/254; 359/296; 359/242
(58) Field of Classification Search ........... 359/254, 359/296
See application file for complete search history.

(56) References Cited

U.S. PATENT DOCUMENTS

| | | | |
|---|---|---|---|
| 4,071,430 A * | 1/1978 | Liebert | 359/241 |
| 5,216,416 A | 6/1993 | DiSanto et al. | |
| 6,132,570 A * | 10/2000 | Akram et al. | 204/202 |
| 2003/0058521 A1* | 3/2003 | Kawai | 359/296 |
| 2004/0032391 A1* | 2/2004 | Liang et al. | 345/107 |
| 2004/0075798 A1* | 4/2004 | Inoue et al. | 349/129 |
| 2004/0241517 A1* | 12/2004 | Shinozaki et al. | 429/33 |
| 2005/0099559 A1* | 5/2005 | Lee et al. | 349/113 |
| 2005/0162366 A1* | 7/2005 | Moriya et al. | 345/97 |
| 2006/0145144 A1* | 7/2006 | Lee et al. | 257/40 |
| 2008/0024428 A1* | 1/2008 | Gillies et al. | 345/107 |

FOREIGN PATENT DOCUMENTS

| | | |
|---|---|---|
| EP | 1462847 A1 * | 9/2004 |
| JP | 6-509883 | 11/1994 |
| JP | 2001-125149 | 5/2001 |
| JP | 2002-149115 | 5/2002 |
| JP | 2003-270675 | 9/2003 |
| WO | WO 03/027763 | 4/2003 |

OTHER PUBLICATIONS

Notification of the First Office Action for corresponding Chinese Patent Application Serial No. 200610145451X, dated Feb. 1, 2008.
Office Action issued in corresponding Japanese Patent Application No. 2006-309971; issued Mar. 2, 2010.

* cited by examiner

*Primary Examiner*—Jessica T Stultz
(74) *Attorney, Agent, or Firm*—Brinks Hofer Gilson & Lione

(57) ABSTRACT

An electrophoretic display device is described. The device includes a substrate, first electrodes, an electrophoretic film having electrophoretic particles, and second electrodes. The substrate is has a plurality of pixel regions. First electrodes are disposed respectively on each pixel region, and include first patterns separated from one another and second patterns connected to the first patterns. The second electrode is disposed on the electrophoretic film. The area of one of the electrodes, opposing the other of the electrodes has apertures formed therein, reducing the contact area between the electrode and the electrophoretic film.

9 Claims, 8 Drawing Sheets

US 7,884,993 B2

ELECTROPHORETIC DISPLAY DEVICE

This application claims the benefit of priority to Korean application No. 110511/2005, filed on 18 Nov. 2005, which is incorporated herein by reference.

TECHNICAL FIELD

The present application relates to an electrophoretic display device. More particularly, the present application relates to an electrophoretic display device capable of reducing leakage, and increasing a voltage holding ratio.

BACKGROUND

Flexible displays such as "electronic paper" may be formed with electrophoretic materials. Compared to LCD, plasma or other similar flat display devices, electrophoretic display devices have the characteristic that they retain their images after power is turned off. Thus, since power needs to be supplied to an electrophoretic display device only when switching the displayed image, such devices may be used for electronic paper that needs to retain an image over a prolonged time period.

FIG. 1A is a plan view of a unit pixel of an electrophoretic display device. FIG. 1B is a sectional view taken along a line I-I' in FIG. 1A. A plurality of gate lines 11 and data lines 12 are disposed to intersect on a substrate 10, thereby forming a pixel region on the substrate 10. In addition, common lines 13 are formed in parallel with the gate line 11 on the substrate 10. The common lines 13 are spaced apart from the gate lines 11 by a predetermined interval.

A thin film transistor Tr is disposed within the pixel region. The thin film transistor Tr includes a gate electrode 21 electrically connected to the gate lines 11, an active layer 23 insulated from the gate electrode 21, a source electrode 24a electrically contacted on the active layer 23 and electrically connected with the data lines 12, and a drain electrode 24b electrically contacted on the active layer 23 and spaced apart from the source electrode 24a.

A capacitor lower electrode 14 electrically connected to the common lines 13 and a capacitor upper electrode 15 electrically connected to the drain electrode 24b are formed within the pixel region. The capacitor upper electrode 14 is overlapped with the capacitor lower electrode 15. An insulating layer is interposed between the capacitor upper electrode 15 and the capacitor lower electrode 14 to form a storage capacitance there between. A first electrode 50 is electrically connected to the drain electrode 24b of the thin film transistor Tr.

An electrophoretic film 60 and a second electrode 70 are disposed on the first electrode 50. The electrophoretic film 60 includes electronic ink that moves by means of electric fields, and a polymer.

The electronic ink formed in the electrophoretic film 60 is driven by an electric field formed between the first electrode 50 and second electrode lines 70 to display an image from the electrophoretic display device.

In order to act as electronic paper, the electrophoretic display device must retain an image over a prolonged duration, and the electrophoretic display device requires a high voltage holding ratio. The voltage holding ratio is a charging voltage ratio over time of a signal voltage first applied to the electrophoretic display device, and the next signal voltage applied thereto. The voltage holding ratio is affected by the surface resistance of the electrophoretic film 60.

Table 1 below shows simulation results of voltage holding ratios parametric in the surface resistances of the electrophoretic film 60.

TABLE 1

| | Surface Resistance ($\Omega/\mu m^2$) | | | | |
| --- | --- | --- | --- | --- | --- |
| | $10^9$ | $10^{10}$ | $10^{11}$ | $10^{15}$ | $10^{21}$ |
| Voltage Holding Ratio (%) | 6.08 | 75.4 | 97 | 99.7 | 99.7 |

As the surface resistance of the electrophoretic film 60 increases, the voltage holding ratio of the electrophoretic display device also increases.

When the contacting area between the surface of the electrophoretic film 60 and the conductive first electrode 50 increases, the surface resistance of the electrophoretic film 60 decreases, and the voltage holding ratio of the electrophoretic display device also decreases. When the voltage holding ratio of the electrophoretic display device is thus lowered, the image on the electrophoretic display device may fade. Moreover, when the surface resistance of the electrophoretic film 60 is reduced, an increase of leakage voltage at the interface between the electrophoretic films 60 and the first electrode 50 results.

SUMMARY

An electrophoretic display device with a high voltage holding ratio is described. The electrophoretic display device may include: a substrate having a pixel region and a first electrode disposed on the pixel region, where the first electrode may have a plurality of first patterns separated from each other on the pixel region; a second pattern electrically connected to two or more of the first patterns. An electrophoretic film including electrophoretic particles may be disposed on the first electrode. A second electrode may be disposed on the electrophoretic film.

In another aspect an electrophoretic display device may include a substrate having a pixel region and a first electrode disposed on the pixel region and having at least one aperture therein that exposes the substrate. An electrophoretic film may be disposed on the first electrode and include electrophoretic particles. A second electrode may be disposed on the electrophoretic film.

BRIEF DESCRIPTION OF THE DRAWINGS

The accompanying drawings, which are included to provide a further understanding of the invention and are incorporated in and constitute a part of this application, illustrate examples of the invention Wherever possible, the same reference numbers will be used throughout the drawings to refer to the same or like parts.

In the drawings.

DETAILED DESCRIPTION

Examples of the invention may be better understood with reference to the drawings, but these examples are not intended to be of a limiting nature. Rather, the invention is to cover all modifications, equivalents, and alternatives falling within the spirit and scope of the invention which is set forth by the claims.

Figure 1A:
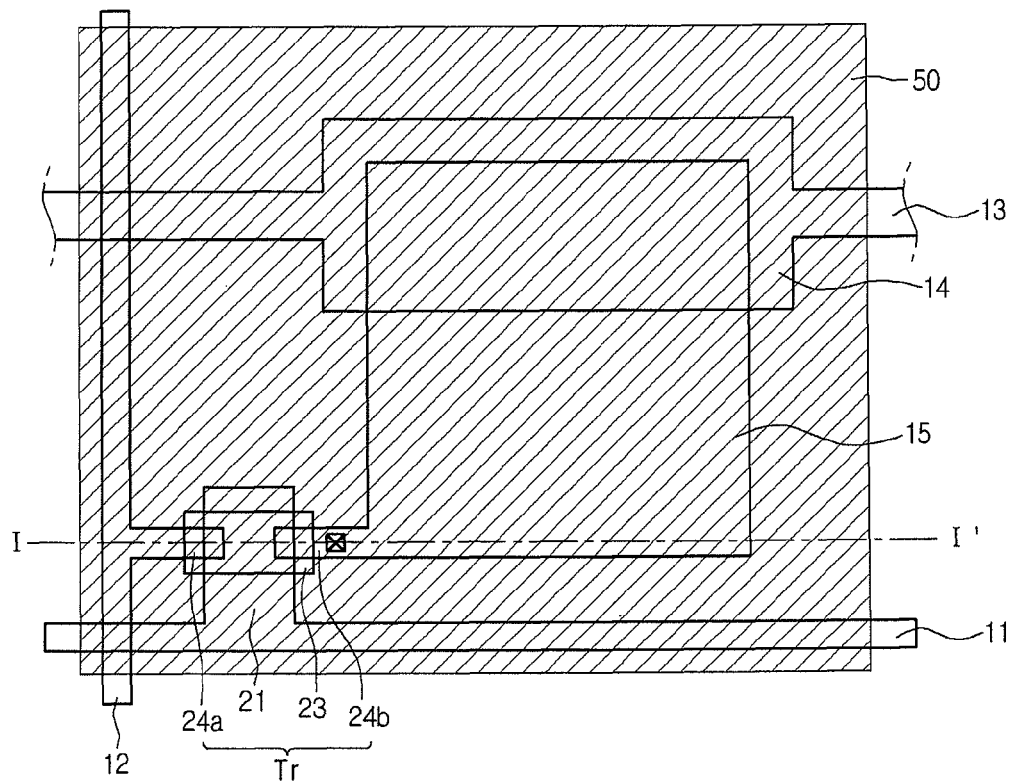
FIG. 1A is a plan view illustrating an electrophoretic display device according to the related art.
Figure 1B:
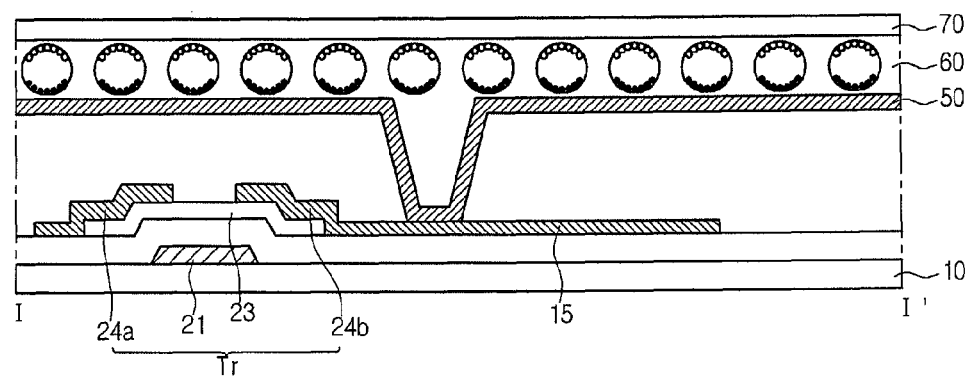
FIG. 1B is a sectional view taken along a line I-I' in FIG. 1A.
Figure 2A:
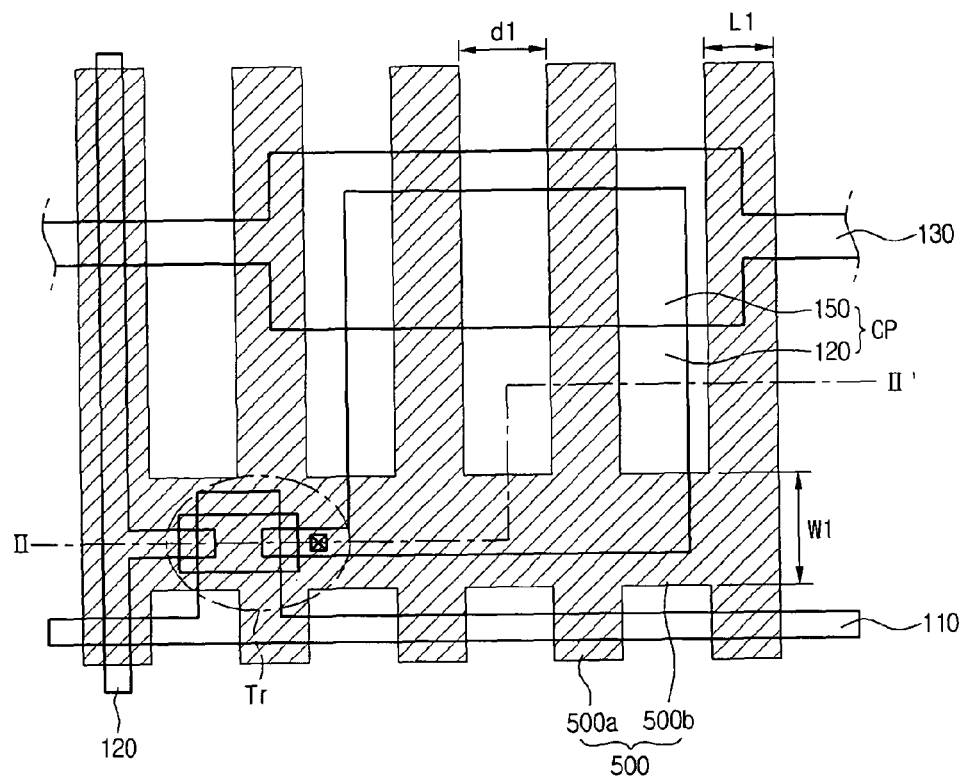
FIG. 2A is a plan view illustrating an electrophoretic display device according to the first example.
Figure 2B:
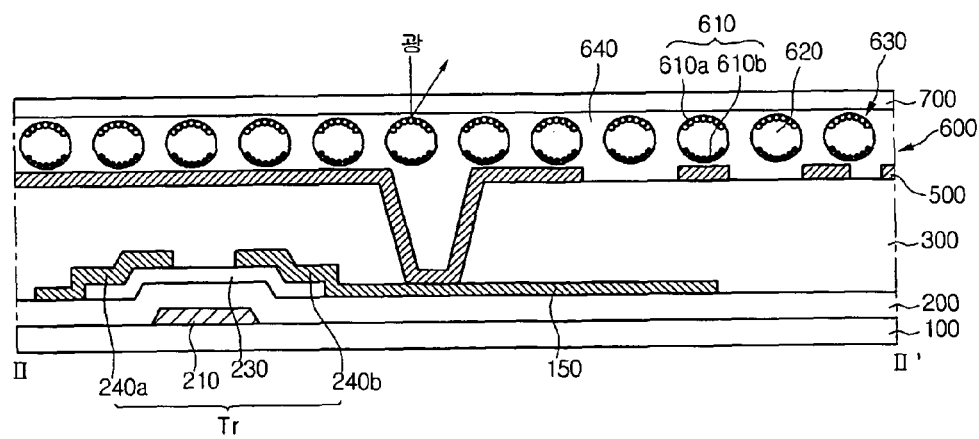
FIG. 2B is a sectional view taken along a line II-II' in FIG. 2A.

FIG. 2A is a plan view illustrated a unit pixel of first example of an electrophoretic display device, and FIG. 2B is a sectional view taken along a line II-II' in FIG. 2A.

The electrophoretic display device includes a first electrode 500, an electrophoretic film 600, and a second electrode 700. The first electrode 500, the electrophoretic film 600, and the second electrode 700 may be formed on a substrate 100. A plurality of gate lines 110 and data lines 120 are disposed to intersect on a substrate 100 so that a plurality of pixel regions are formed on the substrate 100, one of which is illustrated.

The substrate 100 may include a flexible material. The substrate 100, for example, may be a glass substrate, plastic substrate, or stainless steel substrate, or other suitable materials.

The first electrode 500 includes a first pattern 500A and a second pattern 500B. A plurality of first patterns 500A are spaced apart from each other by a predetermined interval and the second pattern 500B is electrically connected to each of the first patterns 500A. Each of the first patterns 500A, for example, is arranged in parallel with the data line 120. The second pattern 500B is arranged in perpendicular to the first patterns 500A. In this example, the second pattern 500B is overlapped with the first patterns 500A and the second pattern 500B is in parallel with the gate lines 110.

Since the plurality of the first and second patterns 500A and 500B of the first electrode 500 are formed within the pixel region a contacting area between the first electrode 500 and an electrophoretic film 600 is decreased. Therefore, the voltage holding ratio of the electrophoretic display device may be increased. That is, when the contacting area between the electrophoretic film 600 and the conductive first electrode 500 is reduced, the surface resistance of the electrophoretic film 600 increases to improve the voltage holding ratio of the electrophoretic display device. In addition, a leakage current that may occur at a boundary between the electrophoretic film 600 and the first electrode 500 may be reduced as the surface resistance of the electrophoretic film 600 increases.

Table 2 shows the simulation results of a voltage holding ratio as a function of the gap distance (d1) between the first patterns 500A.

TABLE 2

| | Gaps (μm) Between First Patterns | | | | |
|---|---|---|---|---|---|
| | 2 | 3 | 4 | 5 | 6 |
| Voltage Holding Ratio (%) | 94.8% | 95.3 | 95.6 | 95.8 | 96 |

As shown in Table 2, when there is a gap (d1) of 3 μm between the first patterns 500A, the voltage holding ratio of the electrophoretic display device was 95% or higher.

Figure 3A:
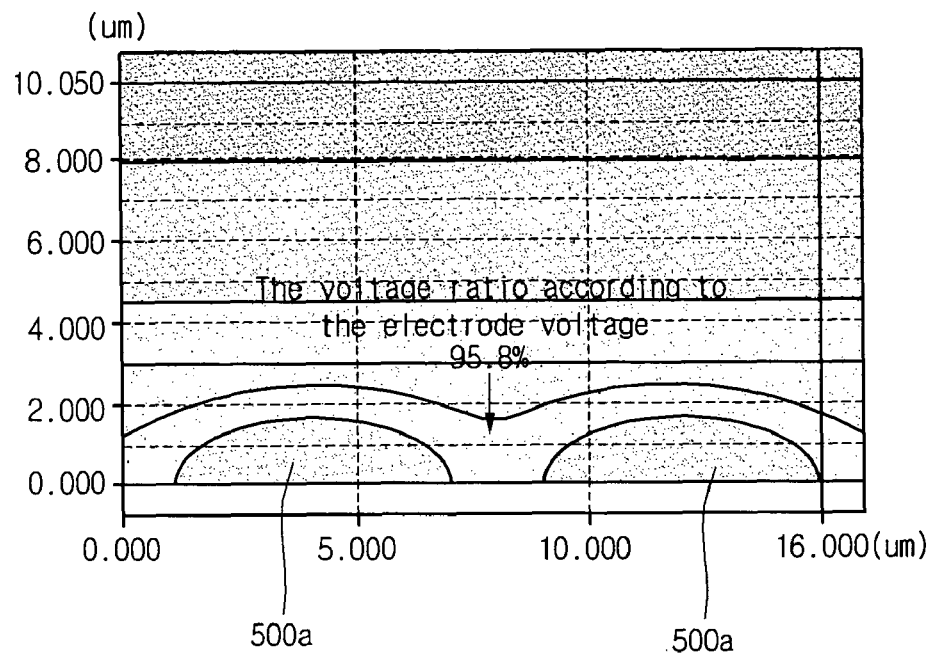
FIGS. 3A through 3C are graphs showing the equipotentiality of the gaps between the first patterns.
Figure 3B:
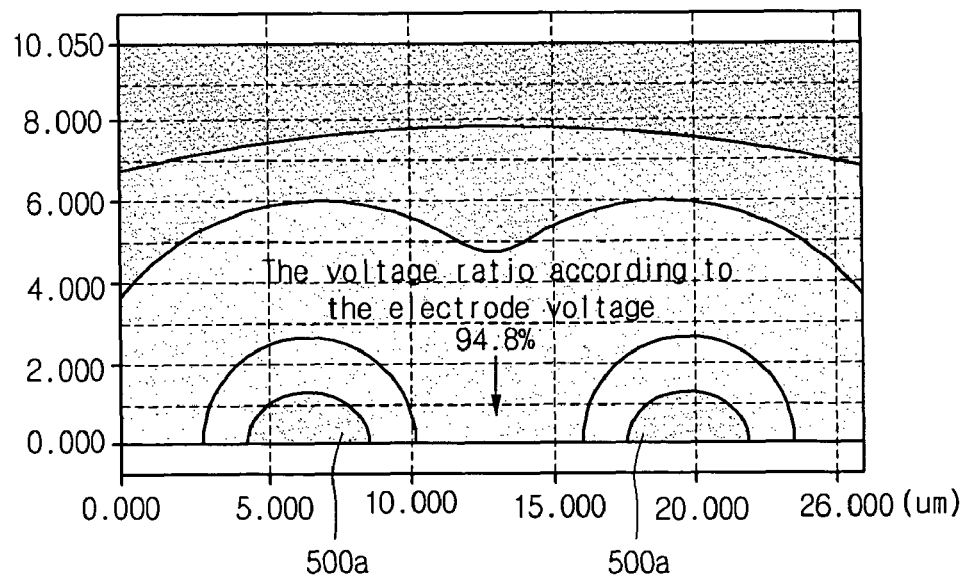
Figure 3C:
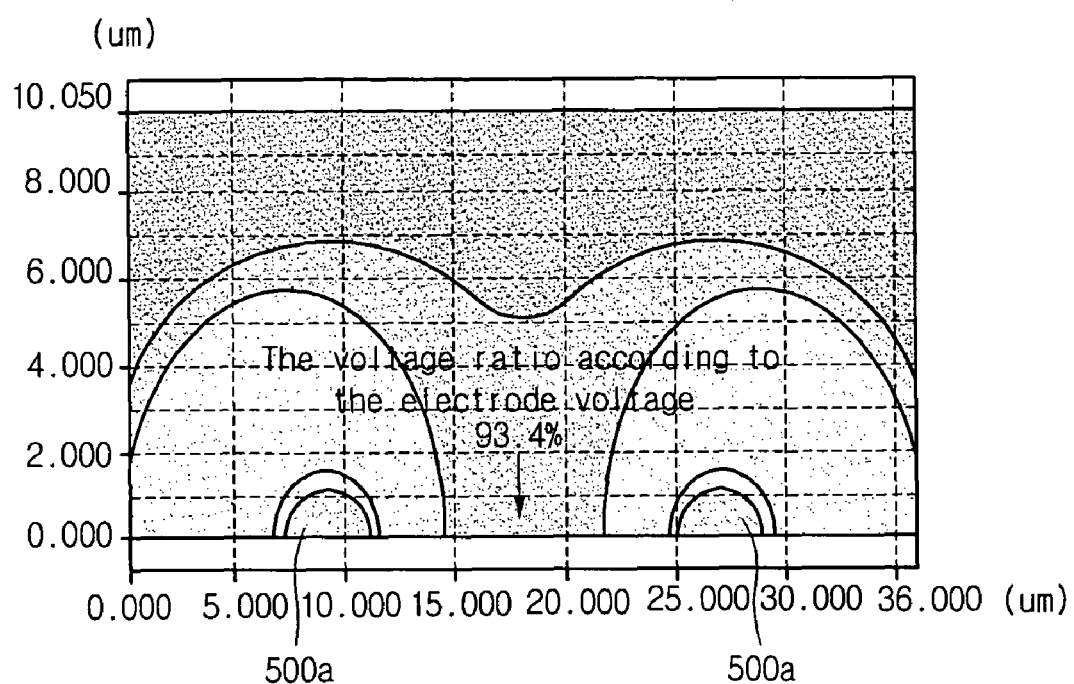

FIGS. 3A through 3C are graphs showing the equipotentiality of the gaps in the first patterns. Here, FIG. 3A is a graph showing the equipotentiality of the gaps between the first patterns when they are 5 μm. FIG. 3B is a graph showing the equipotentiality of the gaps between the first patterns when they are 10 μm. FIG. 3C is a graph showing the equipotentiality of the gaps between the first patterns when they are 15 μm.

Referring to FIGS. 3A through 3C, when the gap (d1) between the first patterns 500A increases, the voltage ratio in the gap between the first patterns 500A becomes lower. When the gap between the first patterns 500A is 15 μm, the voltage ratio decreases, and the response of the electronic ink display may slow down, and the resolution of the device may deteriorate.

Therefore, the separation distance d1 of adjacent two first patterns 500A may be about 3 μm to about 10 μm. When the distance d1 between the first patterns 500A is less than about 3 μm, the decrement of the area of the first electrode 500 is small and a small effect on increasing the voltage holding ratio. When the distance d1 between the neighboring first patterns 500A are greater than about 10 μm, the electrophoretic particles in the electrophoretic film between the first patterns 500A may be poorly driven. A length L1 of the first patterns 500A is formed with the same length as, or a shorter length than, the distance d1 between the first patterns 500A, so that all of the electrophoretic particles in the electrophoretic film of a pixel may be driven, resulting in a uniform image formation.

The first electrode 500 may include a transparent conductive material and a reflective conductive material. The transparent conductive material may be indium tin oxide (ITO) or indium zinc oxide (IZO), for example. The reflective conductive material may be platinum (Pt), gold (Au), Iridium (Ir), chromium (Cr), magnesium (Mg), silver (Ag), nickel (Ni), aluminum (Al), or alloys of these materials.

Figure 4A:
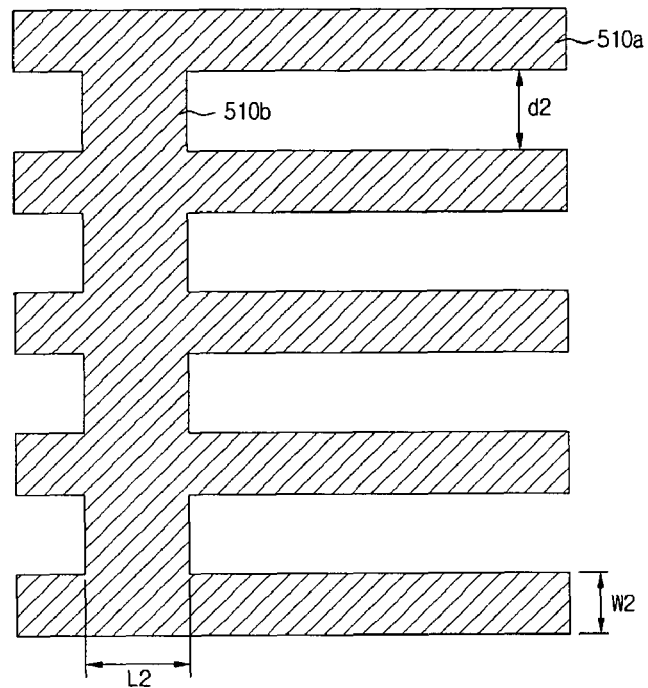
FIGS. 4A and 4B are plan views illustrating two configurations of first electrodes that may be applied to the electrophoretic display device.
Figure 4B:
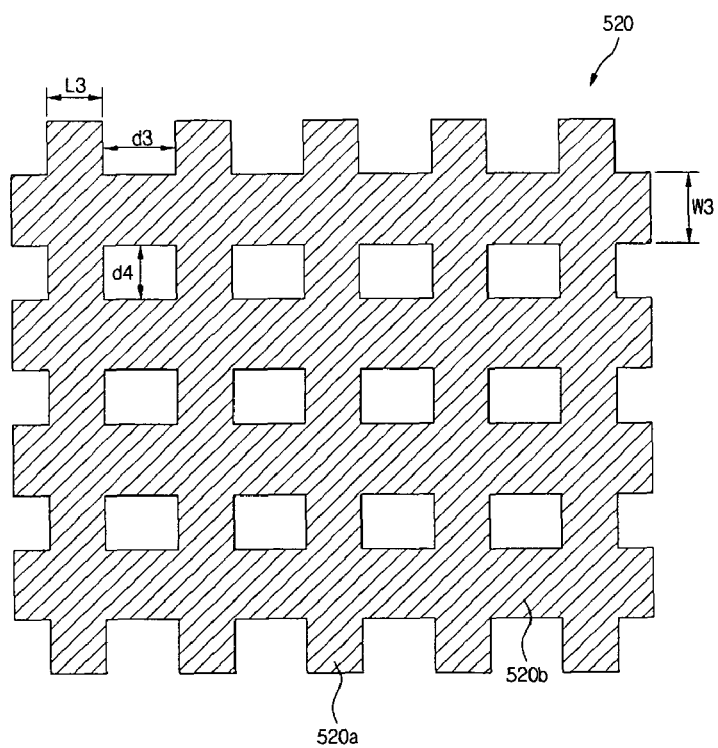

FIGS. 4A and 4B are plan views of two configurations of first electrodes that may be used in the first example of electrophoretic display device.

FIG. 4A shows an alternately configured first electrode 510 that may be applied to an electrophoretic display device, including first patterns 510A and second patterns 510B. The first patterns 510A are separated by a plurality of respectively predetermined distances, and the second patterns 510B are electrically connected so as to join at least two of the mutually separated first patterns 510A. The first patterns 510A are formed in a vertical striped configuration by being parallelly disposed to gate lines 110, and the second patterns 510B are formed in a horizontal striped configuration by being parallelly disposed to data lines 120. A distance d2 between the first patterns 510A is between about 3 to about 10 μm. The widths W2 of the first patterns 510A may be approximately equal to or less than the distance d2 between the neighboring first patterns 510A.

The length L2 of the second pattern 500B of the first electrode 500 may be made larger than the size of a contact hole. The second pattern 500B and the thin film transistor may be electrically connected through the contact hole.

In FIG. 4B, another configuration of a first electrode 520 includes mutually separated first patterns 520A and second patterns 520B intersecting with the first patterns 520A to form a lattice.

In order to reduce interference in forming an image, the neighboring first patterns 520A have a distance d3 therebetween that is between about 3 to about 10 μm, and the length L3 of the first patterns 520A is either approximately smaller than or equal to the distance d3 between the first patterns 520A. A distance d4 between the neighboring second patterns 520B is between about 3 to about 10 μm, and the widths W3 of the second patterns 520B are less than or approximately equal to the distance d4 between the neighboring second patterns 520B.

The electrophoretic film 600, shown in FIG. 2B includes a capsule 630 formed of electrophoretic particles 610 and a solvent 620. The electrophoretic particles 610 include first particles 610A that reflect incident light and second particles 610B that absorb incident light. For example, the first particles 610A may be white particles, and the second particles 610B may be black particles. A binder 640 fixes the capsule 630 to the electrophoretic film.

First particles 610A may be charged with a first charge, and second particles 610B may be charged with a second charge.

The second electrode 700 is disposed on the electrophoretic film 600 and may be formed of a transparent and conductive material such as indium tin oxide (ITO) or indium zinc oxide (IZO).

The above-configured electrophoretic display device may be formed with a plurality of separate first electrodes 500, so that the contacting area between the first electrodes 500 and the electrophoretic film 600 can be reduced, thereby increasing the voltage holding ratio.

The electrophoretic display device displays an image through the movement of the electrophoretic particles 610 in the electrophoretic film 600, by means of an electric field generated between the first electrodes 500 and the second electrodes 700. The first particles 610A may be positively charged, and the second particles 610B may be negatively charged, for example. When a positive voltage is applied to the first electrodes 500, the second electrodes 700 adopt a negative electric potential. The negatively charged second particles 610B move toward the first electrode 500, and the positively charged first particles 610A move toward the second electrode 700. When an external light source is incident on the second electrode 700, the first particles 610A reflect the light back again through the second electrode 700, forming a white image.

Conversely, when a negative voltage is applied to the first electrode 500, the second electrode 700 adopts a positive electric potential. The positively charged first particles 610A move toward the first electrode 500, and the negatively charged second particles 610B move toward the second electrode 700. When an external light source is incident on the second electrode 700, the black second particles 610B absorb the light to form a black image.

At least one thin film transistor Tr and a capacitor CP are disposed on the pixel region. The gate lines 110 are connected to the gate electrode 210 of the thin film transistor Tr, and supply a gate signal to the thin film transistor Tr. The data lines 120 are electrically connected with the source electrode 240A of the thin film transistor Tr, and supply a data signal to the thin film transistor Tr. Thus, the thin film transistor Tr provides a data signal to the first electrode 500

The gate lines 110 and the gate electrodes 210 protruding from the gate lines are disposed on the substrate 100. The common lines 130 separated from the gate lines 110 and the capacitor lower electrode 150 connected to the gate lines 130 are disposed on the substrate 100.

A gate insulating layer 200 is disposed on the substrate 100 to cover the gate electrode 210. The gate insulating layer 200 may be, for example, a silicon oxide layer, a silicon nitride layer, or a multilayer of the two.

An active layer 230 is disposed on the gate insulating layer 200 corresponding to the gate electrodes 210. The active layer 230 may be formed, for example, of a multilayer including a channel layer and an ohmic contact layer formed, respectively, of an amorphous silicon and an impurity-doped amorphous silicon.

The data lines 120 may be disposed on the gate insulating layer 200 to intersect with the gate lines 110. A source electrode 240A is disposed on the active layer 230 and electrically connected to the data lines 120. Also, a drain electrode 240B is disposed on the active layer 230 and separated from the source electrode 240A.

A capacitor upper electrode 150 is disposed on the gate insulating layer 200 and electrically connected to the drain electrode 240B.

Thus, the thin film transistor Tr that includes the gate electrode 210, the active layer 230, and source/drain electrodes 240A and 240B, and a capacitor Cp connected to the thin film transistor Tr are disposed on the pixel region of the substrate 100.

A protective layer 300 is disposed on the gate insulating layer 200 to cover the thin film transistor Tr and the capacitor Cp. The protective layer 300 exposes a portion of the drain electrode 240B, forming a contact hole. The protective layer may be formed of benzocyclobutene (BCB), an acrylic-based resin, or a silicon-based resin. The drain electrode 240B is electrically connected to the first electrode 500 through the contact hole.

The width W1 of the second pattern 500B of the first electrode 500 may be formed larger than the size of the contact hole so that the second pattern 500B and the drain electrode 240B may be connected through the contact hole. As described above, the electrophoretic display device is capable of increasing a voltage holding ratio by reducing the area of the first electrode 500 and the contacting area between the first electrode 500 and the electrophoretic film 600 within parameters that may not cause the device to interfere with an image.

Figure 5A:
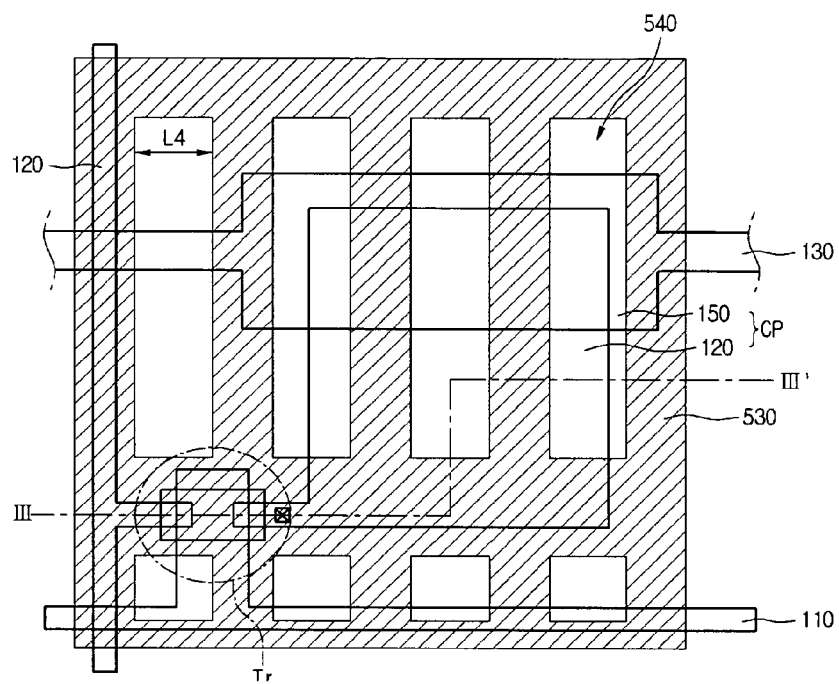
FIG. 5A is a plan view illustrating an electrophoretic display device according to the second example.
Figure 5B:
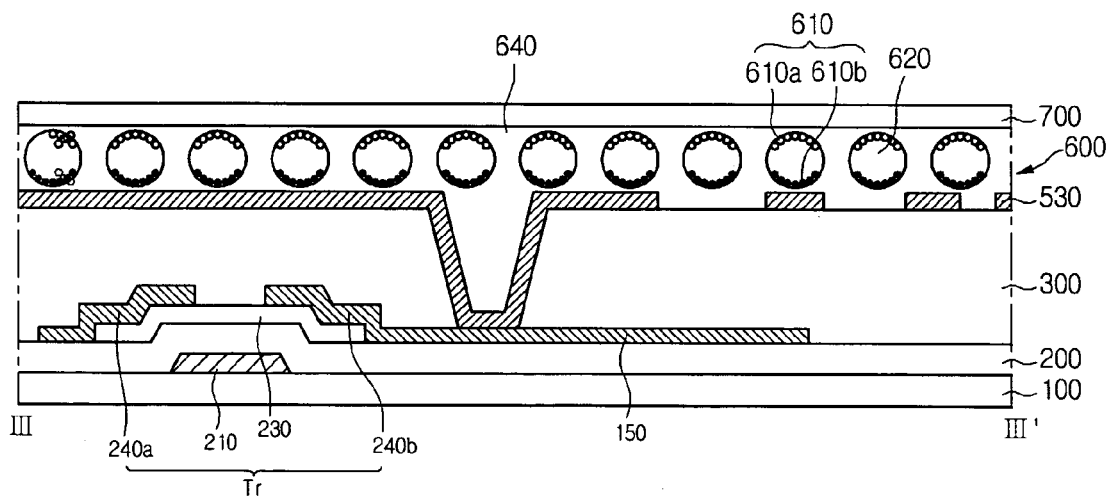
FIG. 5B is a sectional view taken along a line III-III' in FIG. 5A.

FIGS. 5A and 5B are diagrams of a second example of an electrophoretic display device FIG. 5A is a plan view, and FIG. 5B is a sectional view FIG. 5A taken along line III-III'. The electrophoretic display device has the substantially the same structure as the electrophoretic display device of the first example. Thus, repetitive descriptions of like elements will be omitted, and the like elements will be given the same nomenclatures and reference numbers as in the first example.

The electrophoretic display device includes a first electrode 530, an electrophoretic film 600, and a second electrode 700 formed on a substrate 100.

The first electrode 530 has a plurality of apertures 540 for exposing the substrate 100. The apertures 540 are formed in a vertical striped pattern running parallel to the data lines 120. The plurality of apertures 540 formed in the first electrode 530, reduces the area of the first electrode 530. Thus, the contacting area between the first electrode 530 and the electrophoretic film 600 may be reduced, to increase a voltage holding ratio.

The length L4 of the openings is between about 3 to about 10 µm. If the length L4 of the openings 540 is formed to be less than about 3 µm, the decrement of the area of the first electrode 530 would be small, so that there would be only a small increase the voltage holding ratio. If the length L4 of the apertures 540 were to exceed about 10 µm, the electrophoretic particles on the electrophoretic film within the openings may not move effectively.

The first electrode 530 is electrically connected to the thin film transistor Tr formed on the substrate 100, and is driven through the thin film transistor Tr.

Figure 6A:
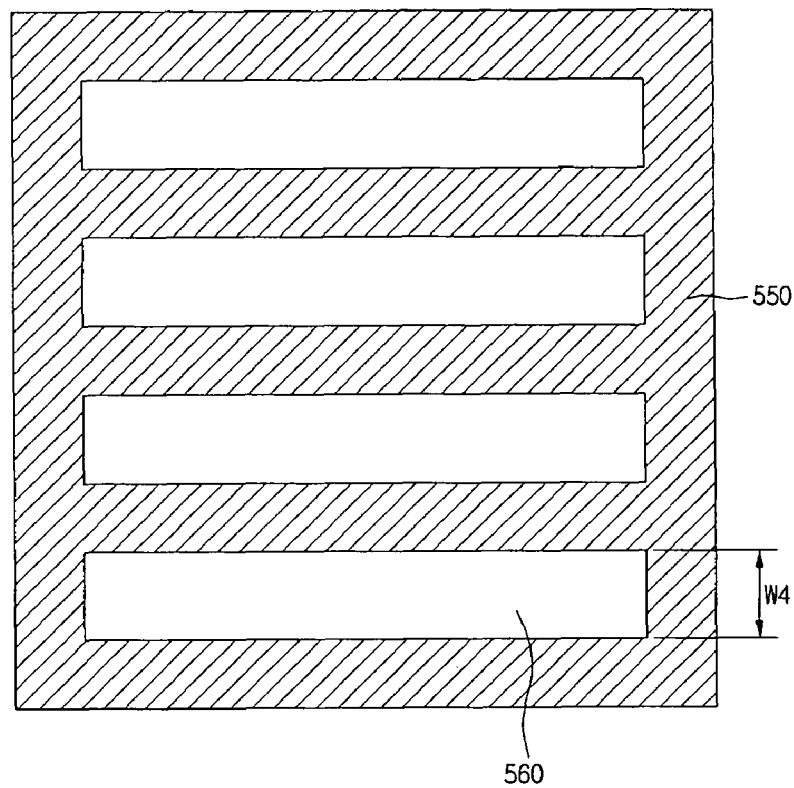
FIGS. 6A and 6B are plan views illustrating two configurations of first electrodes that may be applied to the electrophoretic display of the second example.
Figure 6B:
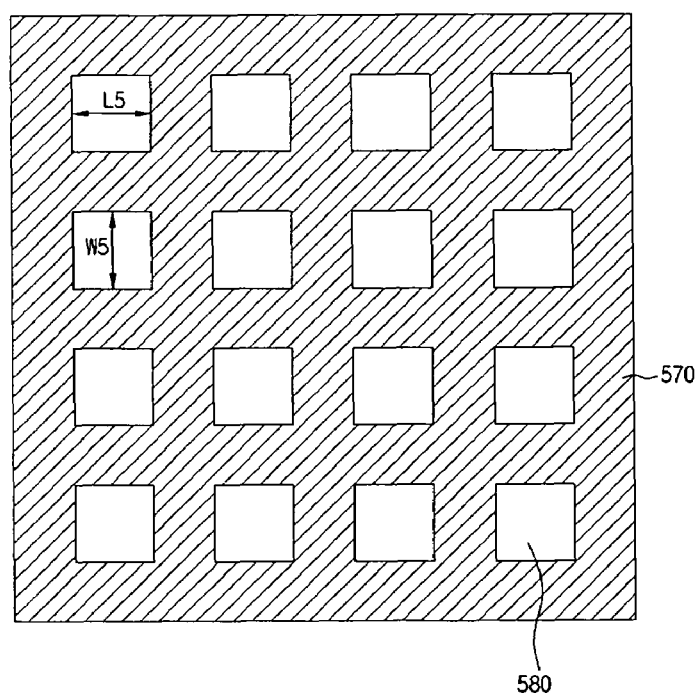

FIGS. 6A and 6B are plan views of two configurations of first electrodes that may used in a display device according to the second example.

A first electrode 550 applicable includes apertures 560 exposing the substrate 100 and arranged in a horizontal stripe pattern parallel to the gate lines 110. The width W4 of the openings 560 is between about 3 and about 10 µm, so that image problems on a finished electrophoretic display device may be avoided, while the voltage holding ratio of the electrophoretic display device is increased.

Another type of first electrode 570, shown in FIG. 6B may have dot-shaped apertures 580 exposing the substrate 100. The apertures 580 may be rectangular, circular, oval, or the like.

When the apertures 580 are rectangular, a length L5 and a width W5 may be between about 3 and about 10 µm, so that image problems on a finished electrophoretic display device may be avoided, while the voltage holding ratio is increased.

The electrophoretic display devices in the above-described examples reduce the contact area between the electrophoretic film and the first electrode, so that the voltage holding ratio of the electrophoretic display device is increased. Also, the resistance at the interface between the electrophoretic film and the first electrode can be increased, so that a leakage current is reduced. Thus, the electrical characteristics of the electrophoretic display device are improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An electrophoretic display device comprising:
   a substrate;
   a gate line on the substrate;
   a data line being intersected with the gate line, wherein the gate line and the data line form a pixel region;
   a thin film transistor being disposed in the pixel region;
   a common line being parallel with the gate line;
   a protective layer covering the gate line, the data line, the thin film transistor and the common line;
   a capacitor upper electrode being connected to a drain electrode of the thin film transistor;
   a first electrode disposed on the protective layer, including:
      a plurality of first patterns separated from each other; and
      a second pattern electrically connected to and crossing the plurality of first patterns within the pixel region;
   an electrophoretic film disposed on the first electrode; and
   a second electrode disposed on the electrophoretic film,
   wherein the first patterns are disposed laterally with each other,
   wherein the capacitor upper electrode overlaps with the first patterns and the second pattern,
   wherein the capacitor upper electrode and the common line form a capacitor,
   wherein the capacitor overlaps with the first patterns, and
   wherein the second pattern is connected with the capacitor upper electrode through a contact hole formed at the protective layer.

2. The electrophoretic display device according to claim 1, wherein a distance between adjacent ones of the plurality of first patterns is between about 3 µm and about 10 µm.

3. The electrophoretic display device according to claim 1, wherein the first patterns have a stripe configuration.

4. The electrophoretic display device according to claim 1, wherein the drain electrode of the thin film transistor is electrically connected to the first electrode.

5. The electrophoretic display device according to claim 1, wherein each of the plurality of first patterns has a width smaller than or equal to a distance between adjacent first patterns.

6. The electrophoretic display device according to claim 1, wherein the substrate includes a flexible substrate.

7. The electrophoretic display device according to claim 1, wherein the first electrode is formed of indium tin oxide (ITO) or indium zinc oxide (IZO).

8. The electrophoretic display device according to claim 1, wherein the first electrode is formed of at least one material selected from the group consisting of Pt (platinum), Au (gold), Ir (iridium), Cr (chromium), Mg (magnesium), Ag (silver), Ni (nickel), Al (aluminum) and an alloy.

9. The electrophoretic display device according to claim 1, wherein the second electrode includes indium tin oxide (ITO) or indium zinc oxide (IZO).

* * * * *